United States Patent
Pabst et al.

(10) Patent No.: US 7,766,626 B2
(45) Date of Patent: Aug. 3, 2010

(54) MULTIPISTON PUMP

(75) Inventors: Carsten Pabst, Stuttgart (DE); Marc Micke, Kornwestheim (DE); Matthias Hurst, Immenstadt (DE); Guy-Edward Michalski, Darmstadt (DE)

(73) Assignee: Robert Bosch GmbH, Stuttgart (DE)

( * ) Notice: Subject to any disclaimer, the term of this patent is extended or adjusted under 35 U.S.C. 154(b) by 612 days.

(21) Appl. No.: 10/579,569

(22) PCT Filed: Nov. 18, 2004

(86) PCT No.: PCT/DE2004/002543

§ 371 (c)(1),
(2), (4) Date: May 17, 2006

(87) PCT Pub. No.: WO2005/050015

PCT Pub. Date: Jun. 2, 2005

(65) Prior Publication Data

US 2007/0110590 A1    May 17, 2007

(30) Foreign Application Priority Data

Nov. 18, 2003 (DE) ................................ 103 53 834

(51) Int. Cl.
*F04B 1/04* (2006.01)

(52) U.S. Cl. .................. 417/273; 417/221; 303/116.4; 92/72

(58) Field of Classification Search .......... 417/221, 417/269, 270, 271, 273; 92/68, 72, 73, 71; 91/492; 303/116.4, 116.1, 116.3

See application file for complete search history.

(56) References Cited

U.S. PATENT DOCUMENTS

| | | | | |
|---|---|---|---|---|
| 1,014,330 A | * | 1/1912 | Reeve | 60/39.281 |
| 1,964,679 A | * | 6/1934 | Springfield | 417/238 |
| 5,167,493 A | | 12/1992 | Kobari | |
| 5,992,944 A | | 11/1999 | Hara | |
| 6,065,816 A | * | 5/2000 | Nakazawa | 303/116.4 |
| 6,446,435 B1 | * | 9/2002 | Willmann et al. | 60/533 |
| 2008/0298982 A1 | * | 12/2008 | Pabst et al. | 417/273 |

FOREIGN PATENT DOCUMENTS

| | | |
|---|---|---|
| DE | 4138313 A1 | 5/1992 |
| DE | 40 41 800 A1 | 6/1992 |
| JP | 6-336973 | 12/1994 |
| JP | 2002-517354 | 6/2002 |

* cited by examiner

*Primary Examiner*—Devon C Kramer
*Assistant Examiner*—Todd D Jacobs
(74) *Attorney, Agent, or Firm*—Ronald E. Greigg

(57) ABSTRACT

A multipiston pump including a plurality of piston pumps hydraulically combined into at least two pump units are coupled on the intake side, but supply two separate hydraulic circuits of a vehicle brake system with pressure fluid. To reduce brake pedal pulsation the piston pumps are driven in phase-offset fashion.

An eccentric unit comprising two spaced-apart cams rotated counter to one another, with the individual piston pumps being located in a number of sectional planes through the pump housing corresponding to the number of cams and locate the connecting conduits for hydraulically coupling the pump units are located in a region of the pump housing defined by the sectional planes.

12 Claims, 3 Drawing Sheets

MULTIPISTON PUMP

CROSS-REFERENCE TO RELATED APPLICATIONS

This application is a 35 USC 371 application of PCT/DE 2004/002543 filed on Nov. 18, 2004.

BACKGROUND OF THE INVENTION

1. Field of the Invention

This invention is directed to an improved multipiston pump for use in a vehicle brake system.

2. Description of the Prior Art

One multipiston pump is already known, for instance from U.S. Patent No. 6446435 B1 which includes a pump drive comprising a rotatably supported shaft and a single cam located on the shaft in a manner fixed against relative rotation. This cam drives an arrangement of a total of six piston pumps, which are arranged radially around the pump drive in the same plane as the pump housing. The pistons of the various piston pumps execute a reciprocating motion and are embodied as stepped pistons, to improve the intake performance. The various piston pumps are hydraulically combined into two pump units. Both pump units are in operative communication with one another on the intake side, but serve as pressure generators for two separate brake circuits of a vehicle brake system. The individual piston pumps combined into one pump unit are arranged in a star pattern and have a rotary angle spacing of 120° from each other. Moreover, the first pump unit is phase-offset from the second pump unit by a rotary angle of 30°. Thus none of the piston pumps is in phase opposition to any of the other piston pumps.

Because of this geometric arrangement of the piston pumps in the pump housing, it is attained that the intake volumetric flows of the various piston pumps sometimes overlap, in that thus the entire intake volumetric flow of the multipiston pump fluctuates with a lesser amplitude around a mean value than is true for instance in a multipiston pump with a 6×60° arrangement of the piston pumps. In other words, less pressure pulsation occurs on the intake side of the multipiston pump. This pressure pulsation can undesirably affect the brake pedal, via a master cylinder of the vehicle brake system, and be perceived by the driver.

The hydraulic combination of the various piston pumps as explained into two separate pump units is done by means of connecting conduits in the pump housing. In the known prior art, for reasons of installation space, these connecting conduits are embodied in a plurality of housing planes, which are spaced apart from the housing plane of the piston pumps. This has an adverse effect on the structural volume of the pump housing. Moreover, locating the piston pumps in the pump housing necessitates embodying the connecting conduits from a relatively large number of individual partial bores extending in different directions in space. This leads to comparatively high effort and cost for machining the pump housing, shorter service lives for the machining tools, and repeated reclamping operations during the machining process. In the subsequent work steps, some of the partial bores must be closed off again from the environment. Besides the effort and expense for assembly, this has the potential risk of leaks.

Moreover, the known arrangement makes a desired grouping of the individual Piston pumps within the pump housing more difficult and thus limits the flexibility in Structurally designing the pump housing. Aside from this, connecting bores that are Relatively long and are diverted multiple times less than the dynamics of a pressure buildup in the brake system and promote the accumulation of unwanted gas bubbles.

Against this background, the object of the present invention is to provide a multipiston pump which, with unaltered good pulsation performance, can be more easily manufactured and occupies a smaller structural volume.

SUMMARY AND ADVANTAGES OF THE INVENTION

A multipiston pump according to the invention has the advantage over the prior art that the geometric location of the individual piston pumps can be selected essentially independently of their hydraulic function. The connecting conduits of the individual piston pumps can now be located in the region of the pump housing that is defined by the two sectional planes in which the piston pumps are located. This requires fewer diversions and less effort and expense for drilling bores. A hydraulically more direct connection with the various piston pumps is achieved, which is expressed, particularly at low ambient temperatures, in shortened pressure buildup times for the brake system. In the embodiment of the multipiston pump according to the invention, the piston pumps, with optimal hydraulic function (little pulsation on the intake side) can be located more flexibly in terms of geometry, depending on the particular application. For instance, the piston pumps of one pump unit may be placed on a first side of the pump housing, and the piston pumps of the second pump unit may be placed on a diametrically opposite second side of the pump housing, which further shortens the required hydraulic connecting bores of the combined piston pumps of one pump unit. A number of piston pumps acted upon by one cam is also variable. It is furthermore possible to design the cams used as having different eccentricities, and to assign special conditions to them within the brake system. Finally, the components of the two brake circuits can be spatially well separated from one another and as a result can be dimensioned and protected more specifically in terms of their endurance strength.

By the characteristics of the invention, simpler production and assembly processes are attained, which markedly shortens the cycle times in machining the pump housing and assembling the multipiston pump. For the machining, simple right-angle stops or counterpart faces on the pump housing suffice. These processes are thus more safely controlled. Finally, with provisions of the invention, the pump housing can be made more compact, thus saving installation space.

BRIEF DESCRIPTION OF THE DRAWINGS

One exemplary embodiment of the invention is described more fully herein below, in conjunction with the drawings, in which.

DESCRIPTION OF THE PREFERRED EMBODIMENT

Figure 1:
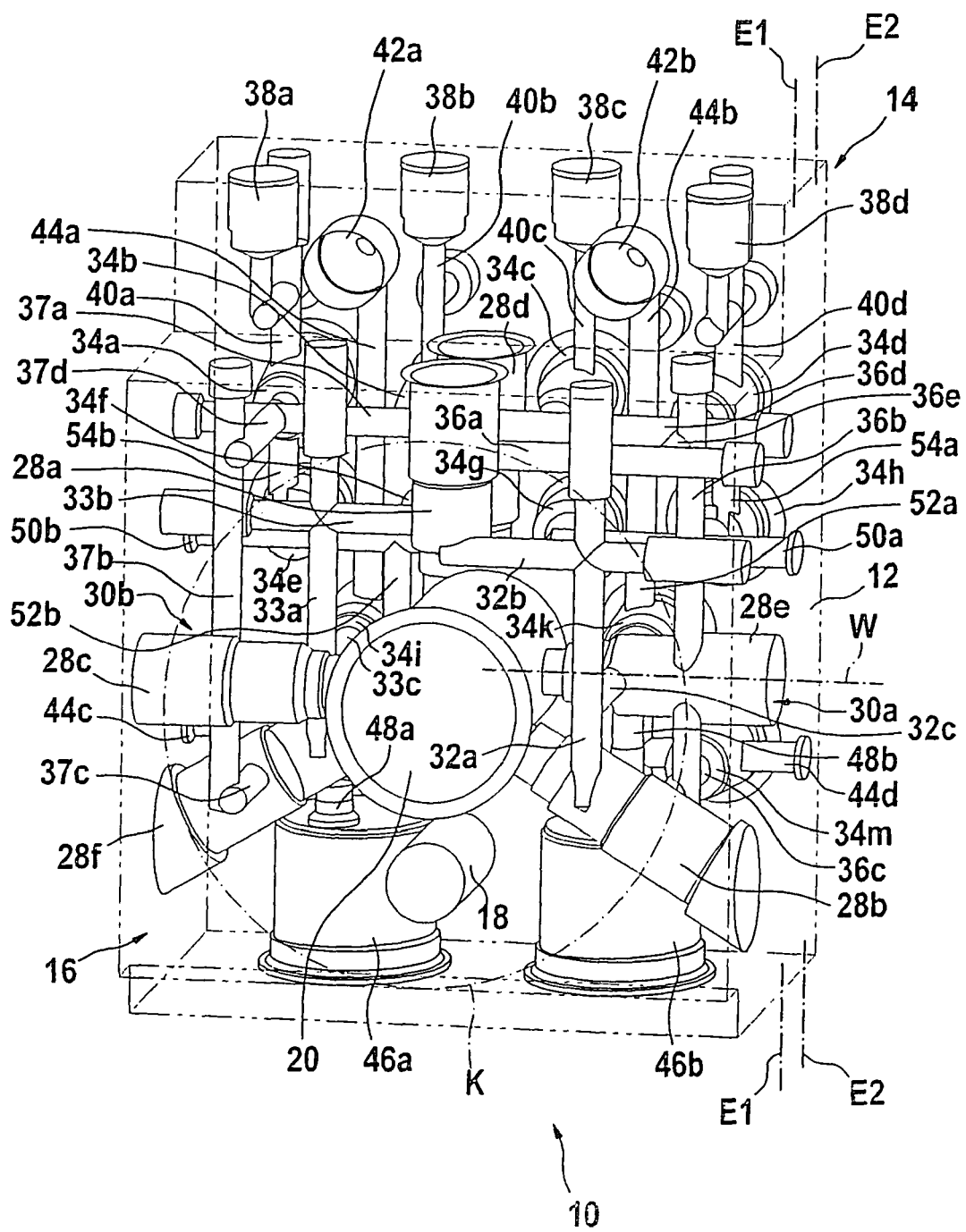
FIG. 1 is a perspective view of a pumping housing, embodied according to the invention, of a multipiston pump.

The pump housing 10 shown in FIG. 1 comprises a solid, essentially parallelepiped block 12, which is preferable made by extrusion from a nonferrous material. In a metal-cutting postmachining process, receptacles (such as 28, 34) for various components, described below, for controlling an electrohydraulic vehicle brake system are made, along with connecting conduits (such as 32, 33, 36, 37) that hydraulically connect these receptacles to one another, in the pump housing 10. The drilling pattern, explained below, of the pump housing 10 represents a mechanical conversion of the hydraulic circuit diagram, known from US 46 435 B1, for an electrohydraulic vehicle brake system. For the mode of operation of this electrohydraulic vehicle brake system, see the above reference. The invention is directed to what from a production standpoint is an especially advantageous arrangement to these receptacles 28, 34 and pressure fluid conduits 32, 33, 36, 37 inside the pump housing 10, which results because of refinements according to the invention, particularly in the pump drive.

The pump housing 10 is shown in FIG. 1 in the installed position. It has a flat back side 14 and a front side 16, which on its top and bottom ends is stepped over the entire width of the block at a right angle to the back side 14. The back side 14 serves to secure an electronic control unit, not shown in FIG. 1, which substantially covers this back side 14. With control unit, electromagnet valves are controlled as a function of the slip conditions at the various wheels of the vehicle. These electromagnet valves are not shown either, but FIG. 1 shows the various valve receiving chambers 34a-m of these electromagnet valves. These valve receiving chambers 34a-m are embodied as stepped blind bores and extend in horizontal orientation from the back side 14 into the interior of the pump housing 10.

Figure 2:
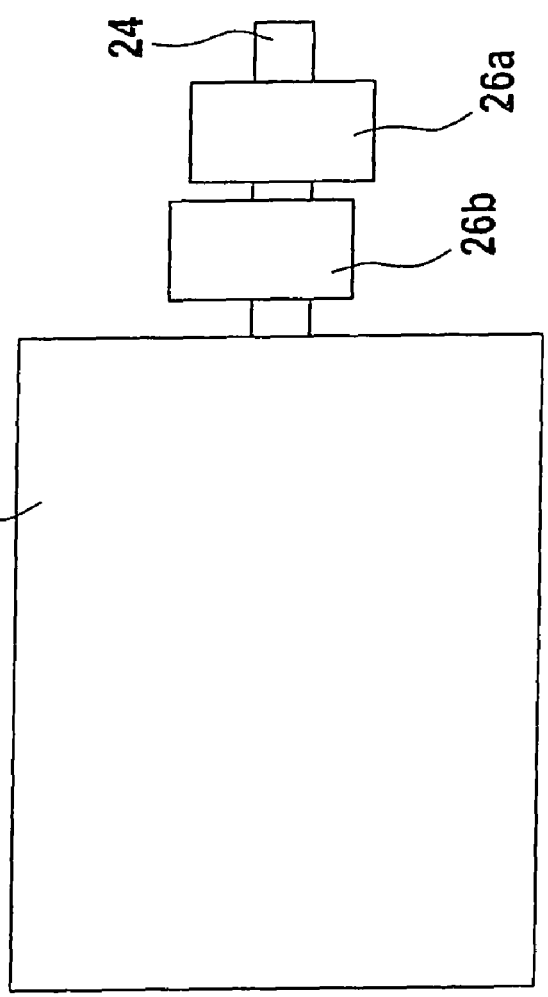
FIG. 2 is schematically simplified, side view of a pump drive, embodied according to the invention, of the multipiston pump of FIG. 1.

The stepped front side 16 serves to secure a drive motor 22 (FIG. 2). A conventional electric motor, whose electrical triggering is also done by the control unit, serves as the drive motor 22. For contacting the drive motor 22, as shown in FIG. 1, there is a through bore 18 in the pump housing, which originates at the front side and discharges into the open on the back side, and through which through bore the electrical contacts of the drive motor, which are not visible in FIG. 1, are extended through to the control unit. The drive motor 22 has a substantially circular cross section, which takes up a majority of the non-stepped part of the front side of the pump housing. The circumferential surface of the drive motor 22 is represented by a circle K drawn in dashed lines in FIG. 1. Discharging into the center of this circle K is a blind-borelike recess 20, which extends, perpendicular to the plane of the drawing, into the interior of the pump housing 10 and is graduated in its inside diameter. This blind-borelike recess 20 forms the receptacle for a pump drive, in the completed state of the pump housing 10.

Figure 3:
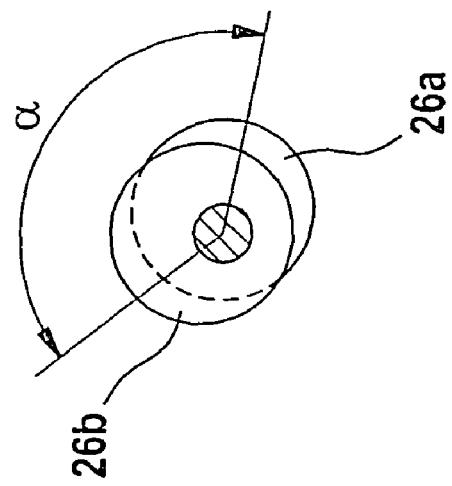
FIG. 3 is a perspective view of the pump drive viewed from the front.

This pump drive is shown schematically in simplified form in FIG. 2. It comprises the aforementioned drive motor 22 and a motor shaft 24 driven by it. According to the invention, this motor shaft 24 drives two axially spaced-apart cams 262, 26b of an eccentric unit to execute a rotary motion. As FIG. 3 shows, the cams 26a, 26b are anchored, rotated counter to one another by a predetermined rotary angle α, in a manner fixed against relative rotation on the common drive shaft 24. In the exemplary embodiment, this rotary angle α is 150°, for example. Both cams 26a, b have eccentricities of equal size, for instance, by if needed it is also conceivable to provide different eccentricities. It should be assumed that the drive shaft 24 is supported on its free end in a shaft bearing (not shown), which can be received in the smaller-diameter end portion of the blind-borelike recess 20 of the pump drive (FIG. 1).

In the pump housing 10 of FIG. 1, a total of six receptacles 28a-f for piston pumps are made by drilling operations into the pump housing 10 radially around this blind-borelike recess 20 of the pump drive. These receptacles 28a, b, c are arranged in a star pattern in a first sectional plane E1 (see also FIG. 4) through the pump housing 10, which sectional plane faces toward the front side 16, while the receptacles 28d, e, f are likewise arranged in a star pattern, in a second sectional plane E2 (see also FIG. 4) through the pump housing 10, which plane is oriented toward the back side 14 of the pump housing 10. The axial spacing of the two sectional planes E1, E2 is essentially equivalent to the axial spacing of the two cams 26a, b on the drive shaft 24. Accordingly, the piston pumps 28a, b, c or 28d, e, f located in one common sectional plane E1 or E2 are each actuated by one of the two cams 26a, b of the pump drive.

Figure 4:
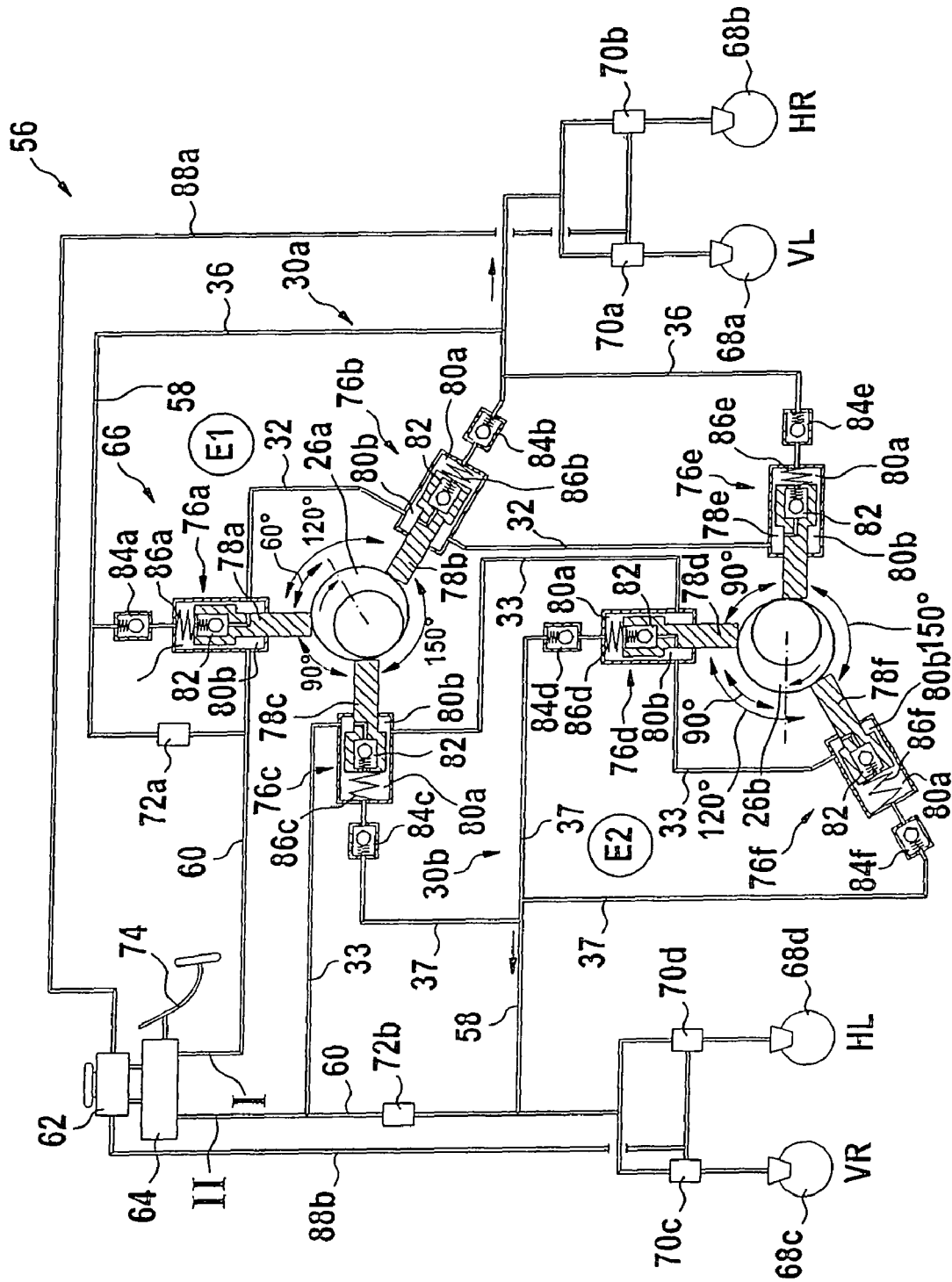
FIG. 4 is a partly schematic view of the geometric arrangement, hydraulic interconnection, and construction of the individual piston pumps of the multipiston pump inside the pump housing.

The longitudinal axes, not shown for the sake of simplicity, of the receptacles 28a, b, c located in the first sectional plane E1 as shown in FIG. 1 have rotary angle spacings, clockwise from one another, of 120°, 150°, and 90° (see FIG. 4, top). The rotary angle spacings of the longitudinal axes of the receptacles 28d, e, f of the second sectional plane E2, likewise viewed clockwise, are 90°, 150°, and 120° (see FIG. 4, bottom). In each plane E1, E2, precisely one receptacle 28a, 28d is oriented vertically, or in other words is in the twelve o'clock position. The result is a geometric arrangement in which four receptacles 28a, b, c, d, e of the total of six receptacles 28a-f are placed at right angles to one another, while only two remaining receptacles 28b and 28f are oriented at clockwise and counterclockwise a rotary angle of spacing of 30° each from a horizontal line W through the two receptacles 28c, 28e. The two receptacles 28a, 28d that discharge vertically toward the upper step of the front side are in alignment one behind the other. Such an arrangement of receptacles 28a-f is especially easy to accomplish in terms of production, since only two receptacles 28b and 28f for piston pumps do not extend parallel to either a vertical or a horizontal line through the pump housing 10. This means fewer complicated reclamping operations in the metal-cutting machining of the pump housing 10.

Stepped piston pumps of conventionally known construction are preferably inserted into the receptacles 28a-f. Their pistons protrude in some portions into the recess 20 in the pump drive and are driven there by the cams 26a, 26b to reciprocate. However, the invention is not necessarily limited to piston pumps with stepped pistons; it is equally applicable to conventional piston pumps with pump pistons that are not stepped.

As an example, three receptacles each 28a, b, e and 28c, d, f for such piston Pumps are hydraulically connected to form a total of two pump units 30a, 30b. In the exemplary embodiment of FIG. 1, the receptacles 28a, b, e of the piston pumps of the first pump unit 30a are located in the right-hand half of the pump housing 10, and the receptacles 28c, d, f of the piston pumps of the second pump unit 30b are located in the left-hand half. The three receptacles each, 28a, b, e or 28c, d, f, are distributed over the two sectional planes E1 and E2 of the pump housing 10. As noted, the receptacles 28a, b, c are located in the sectional plane E1, and the receptacles 28*d, e, f* are located in the sectional plane E2. To that end, various connecting conduits, described in detail below, are provided in the pump housing 10, which connect the low-pressure sides or the high-pressure sides of the piston pumps to one another. The connecting conduits extend according to the invention within the region of the pump housing 10 defined by the two sectional planes E1 and E2.

The low-pressure sides of the piston pumps are each located in the region of the end of the receptacles 28*a-f* oriented toward the recess 20 for the pump drive. First, the course of the low-pressure connecting conduits of the first pump unit 30*a* will be described. A first low-pressure connecting conduit 32*a* originates at the end face of the upper perpendicular step, in FIG. 1, on the front side 16 of the pump housing 10, and extends vertically in the sectional plane E1, longitudinally of the pump housing 10, and ends in the receptacle 28*b*, located diagonally in the pump housing 10, for a first piston pump of this first pump unit 30*a*. A second low-pressure connecting conduit 32*b* begins on the outside of the pump housing 10 at the right in terms of FIG. 1, extends transversely to the first low-pressure connecting conduit 32*a*, likewise in the first sectional plane E1, intersects this first low-pressure connecting conduit 32*a*, and ends in the receptacle 28*a*, discharging toward the upper step of the front side 16, for a second piston pump of the first pump unit 30*a*. Both low-pressure connecting conduits 32*a, b* are widened in diameter on the outsides of the pump housing 10 and are closed off from the environment in pressure-fluid-tight fashion in this region. A third low-pressure connecting conduit 32*c* begins on a bottom face of a blind-borelike valve receiving chamber 34*k* on the back side 14 of the pump housing 10, extends through the pump housing 10, perpendicular to the sectional planes E1 and E2, in the direction of the front side 16, in this way penetrated the receptacle 28*c* for a third piston pump of the first pump unit 30*a*, and discharges directly into the low-pressure connecting conduit 32*a*.

The aforementioned valve receiving chamber 34*k* is intended for receiving a so-called high-pressure switching valve, which controls a pressure fluid connection from a master cylinder of the vehicle brake system, which cylinder is to be connected to the pump housing 10, to the intake side of the pump unit 30*a*.

The high-pressure sides of the piston pumps are located on the ends of the Receptacles 28*a-f* for the piston pumps, which receptacles face away from the recess 20 for the pump drive. These high-pressure sides of the piston pumps of one pump unit 30*a, b* are likewise coupled to one another by means of high-pressure connecting Conduits 36*a-e*. These high-pressure connecting conduits 36*a-e* are located Substantially in the region of the pump housing 10 defined by the two sectional planes E1 and E2 through the pump housing 10. A first high-pressure connecting conduit 36*a*, closed off from the outside, begins on the right-hand outside, in terms of FIG. 1, of the pump housing 10 and extends within the first sectional plane E1 as far as the inside of the receptacle 28*a* of the second piston pump of the first pump unit 30*a*. A second high-pressure connecting conduit 36*b* is located perpendicular to this first high-pressure connecting conduit 36*a*, offset toward the back side of the pump housing 10, begins at the upper right-angled step of the front side 16 of the pump housing 10, intersects the receptacle 28*e* of the third piston pump, and ends at the level of a valve receiving chamber 34*m* in a blind-borelike fashion in the interior of the pump housing 10. This second high-pressure connecting conduit 36*b* is likewise closed off from the environment.

A so-called switchover valve is later built into the valve receiving chamber 34*m*; it divides a pressure fluid connection from the master cylinder, to be connected to the pump housing 10, to a wheel brake to be connected likewise.

A third high-pressure connecting conduit 36*c* originates at the bottom of this valve receiving chamber 34*m* and, once it has intersected the second high-pressure connecting conduit 36*b*, it discharges into the receptacle 28*b* of the first piston pump. A fourth high-pressure connecting conduit 36*d* extends in the second sectional plane E2 parallel to the first high-pressure connecting conduit 36*a* and connects the valve receiving chambers 34*c, d* to one another. These two valve receiving chambers 34*c, d* are intended for electromagnetically actuatable pressure buildup valves, which control the pressure buildup in a wheel brake to be connected to the pump housing 10. By means of a fifth high-pressure connecting conduit 36*e*, which begins at the bottom of a valve receiving chamber 34*d* and, extending perpendicular to the sectional planes E1, E2 through the pump housing 10, intersects the second high-pressure connecting Conduit 36*b*, a communication is established between the first, second and fourth high-pressure connecting conduits 36*a, b, d*.

In the case of a second pump unit 30*b*, a first low-pressure connecting conduit 33*a* begins at the end face of the upper right-angled step, in terms of FIG. 1, on the front side 16 of the pump housing 10, extends vertically in the longitudinal direction of the pump housing 10, and ends in the receptacle 28*f*, located diagonally in the pump housing 10, for the first piston pump of this second pump unit 30*b*. A second low-pressure connecting conduit 33*b* begins on the left-hand outside, in terms of FIG. 1, of the pump housing 10, extends transversely to the first low-pressure connecting conduit 33*a*, penetrates it, and ends in the receptacle 28*d*, discharging toward the upper step of the front side 16, for a second piston pump of the second pump unit 30*b*. Both low-pressure connecting conduits 33*a*, 33*b* are widened in diameter on the outsides of the pump housing 10 and are closed off in pressure-fluid-tight fashion from the environment in this region. A third low-pressure connecting conduit 33*c* begins on a bottom face of the blind-borelike valve receiving chamber 34*i* on the back side 14 of the pump housing 10, extends perpendicular to the sectional planes E1 and E2 through the pump housing 10 in the direction of the front side 16, penetrates the first low-pressure connecting conduit 33*a*, and discharges directly into the receptacle 28*c* for the third piston pump of this pump unit 30*b*.

The valve receiving chamber 34*i* mentioned is intended for receiving a second high-pressure switching valve, which controls a pressure fluid communication from a master cylinder of the vehicle brake system, to be connected to the pump housing 10, to the intake side of the second pump unit 30*b*.

The high-pressure sides of the piston pumps of the second pump unit 30*b* are also coupled hydraulically with one another by means of high-pressure connecting conduits 37, which are embodied inside the region of the pump housing 10 defined by the two sectional planes E1 and E2. A first high-pressure connecting conduit 37*a*, closed off from the outside, begins on the left-hand outside, in terms of FIG. 1, of the pump housing 10 and extends in the second sectional plane E2 into the receptacle 28*d* for a piston pump of the second pump unit 30*b*. A second high-pressure connecting conduit 37*b* is oriented perpendicular to this first high-pressure connecting conduit 37*a* and is located in the first sectional plane E1. It begins at the upper right-angled step of the front side 16 of the pump housing 10, intersects the receptacle 28*c* of the piston pump of this pump unit 30*b*, and ends at the level of a further valve receiving chamber 34*l* in a blind-borelike fashion in the interior of the pump housing 10. This second high-pressure Connecting conduit 37b is likewise closed off from the environment.

A further so-called switchover valve is later built into the valve receiving Chamber 34l; it divides a pressure fluid connection from the master cylinder, to be Connected to the pump housing 10, to a wheel brake to be connected likewise.

A third high-pressure connecting conduit 37c originated at the bottom of this valve receiving chamber 34l and, once it has penetrated the receptacle 28f, intersects the second high-pressure connecting conduit 37b and then ends in the blind-borelike fashion in the interior of the pump housing 10. The first high-pressure connecting conduit 37a connects the valve receiving chambers 34a, b to one another. These two valve receiving chambers 34a, b are intended for electromagnetically actuatable pressure buildup valves, which control the pressure buildup in a wheel brake to be connected to the pump housing 10. By means of a further high-pressure connecting conduit 37d, which begins at the bottom of a valve receiving chamber 34a, a communication is established between the first and the second high-pressure connecting conduits 37a, b. This high-pressure connecting conduit 37d extends perpendicular to the sectional planes E1 and E2 through the pump housing 10, intersects the first high-pressure connecting conduit 37a and then the second high-pressure connecting conduit 37b, and ends in blind-borelike fashion in the interior of the pump housing 1o.

On the outside pointing upward in FIG. 1 of the pump housing 10, there are a total of four hydraulic connections 38a-d, which communicate, via vertically oriented tie bores 40a-d, with the valve receiving chambers 34a-d located below them of the pressure buildup valves. Brake lines that each lead to one wheel brake of a vehicle brake system can be connected to these hydraulic connections 38a-d.

In addition, in the region of the front side 16 of the pump housing that is set back by the upper step, two master cylinder connections 42a, b can be seen. An external master cylinder, by way of which the driver of a vehicle indicates his braking intentions, can be connected to these two connections 42a, b.

A master cylinder, which is known per se in terms of its construction, has two separate brake circuits (FIG. 4, positions I, II), so that for each brake circuit I, II there is its own connection 42a, 42b on the pump housing 10. Beginning at each of these master cylinder connections 42a, 42b, a vertical conduit 44a, b leads indirectly to built-in chambers 46a, b, embodied on the lower face end of the pump housing 10, for low-pressure reservoirs. Along their ways through the pump housing 10, the conduits 44a, b penetrate the valve receiving chambers 34i and 34k of the high-pressure switching valves. Blind-borelike conduits 44c and 44d, which begin at the left and right outside surfaces, respectively, of the pump housing 10 and are oriented vertically to the conduits 44a, b, respectively, establish a pressure fluid communication between the valve receiving chambers 34l and 34m and these vertically extending conduits 44a and 44b. These conduits 44c, d are likewise closed off from the environment. They extend, together with the conduits 44a and 44b, in a further common sectional plane of the pump housing 10. This sectional plane is not shown in the drawing in FIG. 1, because it is located outside the region of the pump housing 10 that is defined by the two sectional planes E1 and E2 and that is definitive for the invention. This last sectional plane is offset still farther toward the back side 14 of the pump housing 10, relative to the sectional plane E2.

The built-in chambers 46a, b communicate, via a respective second additional conduit 48a, b that is offset parallel from the vertical conduits 44a, b, with the receptacles 28c, e, located horizontally in the second sectional plane E2, of the third piston pump of each of the pump units 30a, b, and specifically and particularly they communicate with the low-pressure region of these piston pumps.

Finally, directly below the valve receiving chambers 34a-d of the pressure buildup valves, additional valve receiving chambers 344-h for pressure reduction valves are located on the back side of the pump housing. These valve receiving chambers 34e-h are likewise coupled with one another in the region of their end located in the interior of the pump housing 10 by means of horizontally extending tie conduits 50a, b that originate at the right and left outsides, respectively, of the pump housing 10. The tie conduits 50a, b communicate in turn, through continuous vertical conduits 52a, b in the second sectional plane E2, with the built-in chambers 46a, b of the low-pressure reservoirs. A conduit connection in the form of a short tie bore 54 establishes a hydraulic connection of the valve receiving chambers 34a and 34d to the valve receiving chambers 34e, 34h of the pressure buildup valves.

The pressure reduction valves control the pressure reduction in the wheel brakes of the vehicle that are associated with them.

As already noted, this described arrangement of the two pump units 30a, b is made possible essentially because the pump drive is effected by two axially spaced-apart cams 26a, b. In combination therewith, the two pump units 30a, b are rotated counter to one another. Moreover, at least one piston pump is located in a respective different sectional plane E1, E2 from that of the other piston pumps of the same pump unit 30a, b. Although it does not geometrically look that way, as a result, in the pump housing 10 described, the various receptacles 28a-f of the piston pumps of one pump unit 30a, b are spaced apart, in hydraulic terms, by a rotary angle of 120°. Moreover, the two pump units 30a, b are rotated counter to one another by 30°. In this respect, the arrangement described accordingly matches the multipiston pump that is described in the prior art (US 64 46 435 B1) as being especially low in pulsation. However, the definitive characteristics of claim 1 permit a substantially greater variation in the structural adaption of the pump housing 10 to the respective conditions of a given individual case.

To further clarify these geometric and hydraulic conditions, FIG. 4 shows an electrohydraulic vehicle brake system 56 with an external-force-actuated service brake 58 and a muscle-force-actuated emergency brake 60. The service brake 58 includes a master cylinder 64, provided with a container 62 for pressure fluid, for two brake circuits I, II; a multipiston pump 66 with two pump units 30a, b comprising, for example, a total of three piston pumps each, and a total of four wheel brakes 68a-d. These wheel brakes 68a-d each communicate in pairs with one of the two pump units 30a, b. Each wheel brake 68a-d is preceded by a so-called pressure modulation device 70a-d. Each such device comprises one pressure buildup and one pressure reduction valve (not shown), already mentioned in conjunction with the description of FIG. 1. These valves can be triggered electronically to regulate the pressure level in the individual wheel brakes 68a-d. The pressure buildup valve is moved from an open position to a closing position; the pressure reduction valve is moved vice versa.

The emergency brake 60 comprises direct pressure fluid connections between one circuit I, II of the master cylinder 64 and the particular wheel brakes 68a, b or 68c, d that are assigned to this circuit I, II. One so-called switchover valve 72a, b is connected into each of these pressure fluid connections and is closed, when the service brake 58 is functional, and thus hydraulically deactivates this emergency brake 60.

In the event of a defect, an electrical triggering of the switchover valves 72, b takes place such that they are switched into their open position. There is now a continuous communication between the master cylinder 64 and the individual wheel brakes 68a-d. Thus in the event of a defect, the driver is capable of braking the vehicle equipped with such a brake system 56 by means of his own muscle force. The master cylinder 64 is actuatable for that purpose via a brake pedal 74.

When the service brake 58 is functional, the furnishing of the brake pressure is done not by the muscular force of the driver but rather by external force, in the form of an electrically driven multipiston pump 66. As already noted in conjunction with FIG. 1, the multipiston pump 66 has a total of six piston pumps 76a-f. Their pistons 78a-f are embodied as stepped pistons. Stepped pistons, as their name indicates, are stepped a single time in their outer diameter. Thus a stepped piston, in its associated cylinder, defines two pressure chambers 80a, b that are separated from one another. These pressure chambers 80a, b change their volume in phase opposition to one another. In other words, the volume of one pressure chamber 80a increases while the volume of the other pressure chamber 80b associated with it is decreasing. The two pressure chambers 80a, b have volumes of different sizes and communicate with one another via an interposed check valve 82. As soon as a pressure buildup takes place in the larger-volume pressure chamber 80a, this check valve 82 closes. Stepped piston pumps of this kind are known per se, and there is accordingly no need to described their function in detail below. Stepped piston pumps are distinguished by having substantially improved pulsation behavior on the intake side than conventional piston pumps that have non-stepped pistons.

FIG. 4 also again illustrates the spatial arrangement and hydraulic Interconnection of the total of six piston pumps 76a-f. To that end, the two sectional planes E1 and E2 through the pump housing are shown one below the other in FIG. 4. The piston pumps 76a, b, c are located in the first sectional plane E1, oriented toward the front side 16 of the pump housing 10, while the piston pumps 76d, e, f are located in the second sectional plane E2, axially spaced apart from the first and oriented toward the back side 14 of the pump housing 10. The piston pumps 76a, b, c have rotary angle spacings of 120°, 150°, and 90° clockwise from one another, and the piston pump 76a is oriented vertically, or in other words is located at the twelve o'clock position. By comparison, the piston pumps 76d, e, f have rotary angle spacings of 90°, 150°, and 120° (clockwise) from one another. The piston pump 76d is likewise in the twelve o'clock position and is thus aligned with the piston pump 76a (see FIG. 1). A cam 26a, rotating in the first sectional plane E1, is shown in an instantaneous position in which its maximum eccentricity is approximately 60° clockwise from the twelve o'clock position. By comparison, the maximum eccentricity of the second cam 26b, locating in the second sectional plane E2 and coupled to the first cam 26a in a manner fixed against relative rotation, is located 90° counterclockwise from the twelve o'clock position. In other words, the two cams 26a, b are rotated counter to one another by a rotary angle α of a total of 150°. In the exemplary embodiment of FIG. 4, the two cams 26a, b have eccentricities of equal size.

In hydraulic terms, the piston pumps 76a, b from the first sectional plane E1 communicate with the piston pump 76e from the second sectional plane E2 to the first pump unit 30a. The second pump unit 30b includes the piston pump 76c from the first sectional plane E1 and the piston pumps 76d and 76f from the second sectional plane E2. The piston pumps 76a, b, e of the first pump unit 30a are thus located to the right in FIG. 3, and those of the second pump unit 30b are on the left. With the arrangement described, a grouping of the interconnected piston pumps 76a-f inside the pump housing 10 is possible. The hydraulic interconnection described is effected by means of the connecting conduits 32, 33, 36, 37 shown schematically in FIG. 4 and described constructively in FIG. 1. A distinction should be made between low-pressure connecting conduits 32, 33 and high-pressure connecting conduits 36, 37. The low-pressure connecting conduits 32, 33 connect the low-pressure sides, oriented toward the cam 26a, b, of the respective interconnected piston pumps to one another, and the high-pressure connecting conduits 36, 37 correspondingly connect the high-pressure sides that are located facing away from the cam 26a, b. The high-pressure sides of each of the piston pumps are protected by a respective check valve 84a-f, which prevents pressure fluid that has already been pumped from being capable of flowing back into the pressure chamber 80a upon a reversal of the direction of motion of the piston 78a-f. It can furthermore be seen from FIG. 4 that the pistons 78a-f are urged by springs 86a-f in the direction of the associated cam 26a, b. This assures the contact of the pistons 78a-f with the cam 26a, b. The first pump unit 30a supplies the wheel brakes 68a, b, marked by the letters VL and HR, with pressure fluid, and the second pump unit 30b supplies the wheel brakes 68c, d designated by the letters VR and HL. Finally, the return lines 88a, b should also be mentioned, which beginning at the pressure modulation devices 70a-d return pressure fluid, which occurs upon a pressure reduction, to the container 62. For the sake of simplicity, the vehicle brake system of FIG. 4 is designated as a so-called open system. However, the invention is alternatively Applicable to closed brake systems with integrated low-pressure reservoirs as well.

It is understood that modifications or additions can be made to the exemplary embodiment described without departing from the fundamental concept of the invention. This fundamental concept is considered to be locating the piston pumps 76a-f of one pump unit 30a, b in different planes of the pump housing 10, which dictates the introduction of a second cam 26a, b into the pump drive and furthermore requires that the two pump units 30a, b, that is, the cams 26a, b, be rotated counter to one another along with the associated receptacles 28a-f, offset from one another by rotary angles, of the piston pumps. In addition, the arrangement of the piston pumps 76a-f of a pump unit 30a, b is accomplished in different sectional planes E1 and E2 of the pump housing 10. This is done against the background of advantages in terms of manufacturing feasibility and of using the structural volume, without having to accept disadvantages in terms of the lack of pulsation of a multipiston pump. It is not necessarily required that both cams 26a, b have the same eccentricity of that both cams 26a, b, as described, must drive the same number of piston pumps. The numerical values given for existing rotary angle spacings between the pump units 30a, b on the one hand and the individual piston pumps of one pump unit 30a, b on the other are moreover variable, for instance if what is most important in structurally designing the pump is not the low pulsation of the multipiston pump, but its structural volume or its ease of manufacture.

The foregoing relates to a preferred exemplary embodiment of the invention, it being understood that other variants and embodiments thereof are possible within the spirit and scope of the invention, the latter being defined by the appended claims.

The invention claimed is:

1. In a multipiston pump, having a pump housing, a motor, and an eccentric unit driven by the motor, having an arrangement comprising a plurality of piston pumps, which are combined hydraulically by means of connecting conduits in the pump housing into first and second pump units to supply two hydraulically separate hydraulic circuits with pressure fluid, the low-pressure sides of the piston pumps in the first pump unit being connected hydraulically to one another by a first low-pressure conduit and the high-pressure sides of the piston pumps in the first pump unit being connected hydraulically to one another by a first high-pressure conduit, the low-pressure sides of the piston pumps in the second pump unit being connected hydraulically to one another by a second low-pressure conduit and the high-pressure sides of the piston pumps in the second pump unit being connected hydraulically to one another by a second high-pressure conduit, and the eccentric unit and the arrangement of piston pumps being adapted structurally to one another in the pump housing such that the piston pumps of one pump unit are always actuated in alternation with the piston pumps of the second pump unit with a phase offset between the actuation of the piston pumps of one pump unit on the one hand and the actuation of the two pump units on the other hand, so that the intake phases of at least two piston pumps overlap, without the piston pumps being in phase opposition to one another, the improvement wherein the eccentric unit comprises at least two axially spaced apart cams, wherein the piston pumps are located in a number of sectional planes of the pump housing that correspond to the number of cams with the axial spacing of the cams being essentially equivalent to the axial spacing of these sectional planes; wherein the connecting conduits of the pump units are located in a region of the pump housing defined by the sectional planes, and wherein at least one of the piston pumps, combined hydraulically into a pump unit, is actuated by a different cam from the respective other piston pumps of the corresponding pump unit.

2. The multipiston pump in accordance with claim 1, further comprising a rotary angle spacing in the range of between 110° and 130° between two successively actuated piston pumps of a pump unit.

3. The multipiston pump in accordance with claim 1, wherein the rotary angle spacing between successive actuations of two piston pumps is approximately 30° or approximately 90°.

4. The multipiston pump in accordance with claim 2, wherein the rotary angle spacing between successive actuations of two piston pumps is approximately 30° or approximately 90°.

5. The multipiston pump in accordance with claim 3, wherein the cams are rotated by the rotary angle relative to one another with the rotary angle spacing of the cams being approximately 150°.

6. The multipiston pump in accordance with claim 1, wherein each cam of the eccentric unit drives at least two piston pumps.

7. The multipiston pump in accordance with claim 1, wherein the piston pumps that are combined into a pump unit are located spatially immediately adjacent one another in the pump housing.

8. The multipiston pump in accordance with claim 2, wherein the piston pumps that are combined into a pump unit are located spatially immediately adjacent one another in the pump housing.

9. The multipiston pump in accordance with claim 1, wherein one piston of at least one of the piston pumps is embodied as a stepped piston and defines two pressure chambers each, which are of variable volume in phase opposition to one another.

10. The multipiston pump in accordance with claim 7, wherein one piston of at least one of the piston pumps is embodied as a stepped piston and defines two pressure chambers each, which are of variable volume in phase opposition to one another.

11. In an electrohydraulic vehicle brake system, having an external-force-actuated service brake and a muscle-force-actuated emergency brake, each with two brake circuits the improvement wherein the service brake is equipped with a multipiston pump as defined claim 1.

12. The multipiston pump in accordance with claim 2, further comprising a rotary angle spacing of 120° between two successively actuated piston pumps of a pump unit.

* * * * *